United States Patent [19]

Scribner

[11] Patent Number: 4,555,277

[45] Date of Patent: Nov. 26, 1985

[54] EXTRUSION CAST EXPLOSIVE

[75] Inventor: Kenneth J. Scribner, Livermore, Calif.

[73] Assignee: The United States of America as represented by the Unites States Department of Energy, Washington, D.C.

[21] Appl. No.: 696,276

[22] Filed: Jan. 29, 1985

[51] Int. Cl.[4] .............................................. C06B 45/10
[52] U.S. Cl. .................................... 149/19.4; 149/88; 149/92
[58] Field of Search .......................... 149/19.4, 88, 92

[56] References Cited

U.S. PATENT DOCUMENTS

| | | | |
|---|---|---|---|
| 3,361,689 | 1/1968 | Miegel et al. | 149/19.4 |
| 3,445,306 | 5/1969 | Satriana | 149/19.4 |
| 3,480,490 | 11/1969 | Finger et al. | 149/19.4 |
| 3,554,820 | 1/1971 | Evans | 149/19.4 |
| 3,778,319 | 12/1973 | Benziger | 149/19.4 |
| 4,043,850 | 8/1977 | Hoffmann et al. | 149/19.4 |
| 4,050,968 | 9/1977 | Goldhagen et al. | 149/19.4 |
| 4,168,363 | 9/1979 | Boettcher | 149/19.4 |
| 4,289,551 | 9/1981 | Perrault et al. | 149/19.4 |
| 4,304,185 | 12/1981 | Sayles | 149/19.2 |
| 4,386,978 | 6/1983 | Baczuk et al. | 149/19.4 |
| 4,430,131 | 2/1984 | Tremblay | 149/19.4 |
| 4,456,493 | 6/1984 | Barnes et al. | 149/19.4 |

OTHER PUBLICATIONS

Scribner, "High Performance Extractor Cast Explosives (ECX)" Lawrence Livermore Nalt. Lab., Report No. UCRL 90376 (Feb. 1984) 22 pages.

Primary Examiner—Edward A. Miller
Attorney, Agent, or Firm—Roger S. Gaither; Shyamala T. Rajender; Judson R. Hightower

[57] ABSTRACT

Improved, multiphase, high performance, high energy, extrusion cast explosive compositions, comprising, a crystalline explosive material; an energetic liquid plasticizer; a urethane prepolymer, comprising a blend of polyvinyl formal, and polycaprolactone; a polyfunctional isocyanate; and a catalyst are disclosed. These new explosive compositions exhibit higher explosive content, a smooth detonation front, excellent stability over long periods of storage, and lower sensitivity to mechanical stimulants.

18 Claims, 1 Drawing Figure

EXTRUSION CAST EXPLOSIVE

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

The subject invention relates generally to high energy explosives and more specifically to extrusion cast explosive compositions.

High energy explosives, such as those used in nuclear weapons, have been formulated to have high detonation pressures and high detonation energies. In order to attain these energy levels and to exhibit these properties, such compositions would require a high volume percent of the crystalline explosive which can be achieved only by compression molding or melt casting. Melt-cast explosives generally include crystalline explosives such as octahydro-1,3,5,7-tetranitro-1,3,5,7-tetrazocine, commonly known as octogen or HMX; hexahydro-1,3,5-trinitro-1,3,5-triazene, commonly known as hexogen or RDX. As a result, these compositions are not thermally stable beyond about 80° C. Compression moldable compositions normally use very high volume percent of solids in a plastic matrix. In more recent times, cast-cure compositions with relative thermal stability, have been designed and formulated but, have low or inadequate explosive energy for many applications. An extrusion cast explosive (ECX) is an improvement of the cast-cure type of explosive and is an explosive composition which can be extruded or transferred by fluid or plastic flow into a mold of any desired shape or size and then cured in place to yield the finished explosive in a relatively rigid and stable form.

U.S. Pat. No. 4,289,551 issued to Perrault et al., discloses a pour-cast-cure high energy explosive utilizing either HMX or RDX, a hydroxy-terminated polybutadiene based binder, a diisocyanate as the curing agent, a chemically compatible surfactant and, optionally, a plasticizer.

U.S. Pat. No. 4,050,968 issued to Goldhagen et al., describes a cast-cure explosive using HMX, RDX or perchlorate salts, a readily curable, elastomeric, hydroxyethyl acrylate copolymer as a binder, a diluent or plasticizer, an isocyanate as the cross-linking agent and, optionally, fuels or stabilizers or antioxidants or polymerization catalysts or explosive desensitizers. The polymer is prepared by a free radical initiated solution polymerization or emulsion polymerization.

U.S. Pat. No. 4,043,850 issued to Hoffmann et al., teaches slurry-cast propellants using HMX crystals. The HMX crystals are coated with a solution consisting of benzene and poly-aryl phenylisocyanate in methyl chloride, water and triethylamine, to provide a polyurethane coating on the crystals. A secondary coating may be applied by reacting the residual isocyanates with ethanol.

U.S. Pat. No. 3,778,319 to Benzinger et al., describes a high energy plastic-bonded explosive of 95% HMX, and 2.5% DNPA/F which is a eutectic mixture of the formal and acetal of 2,2-dinitropropanol as the plasticizer. The plasticizer is a thermoplastic, polyurethane elastomer, manufactured by B. F. Goodrich Company and sold under the trade name of Estane, which is prepared from long chain diols and toluene diisocyanate.

U.S. Pat. No. 3,480,490 issued to Finger et al., discloses a high explosive composition for extrusion-casting consisting of HMX or RDX dispersed in liquids of the gem-dinitro aliphatic class, such as FEFO and including therein gelling agents or active polymeric ingredients for curing.

Most of these formulations, however, do not meet the necessary, high performance criteria of high energy/explosive density, uniform consistency, greater homogeneity, low sensitivity to mechanical stimulants, low toxicity, stability over long storage times, and simplicity of handling.

SUMMARY OF THE INVENTION

Accordingly, it is an object of the subject invention to provide improved, high performance multiphase extrusion cast explosive (ECX) compositions.

Another object is to provide ECX compositions which are uniform and homogeneous in consistency.

Another object is to provide ECX compositions which are simple to handle.

Another object is to provide ECX compositions which exhibit low sensitivity to mechanical stimulants.

Yet another object is to formulate ECX compositions with low toxicity.

Still another object is to formulate ECX compositions with excellent stability over long storage times.

Yet, another object is to provide ECX compositions which generate a smooth detonation front.

Still another object is to provide ECX compositions which can be loaded into any configuration with low pressure equipment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the subject invention is directed to improved, multiphase, high performance, high energy, extrusion cast explosive compositions, broadly comprising, a crystalline explosive material; an energetic liquid plasticizer; a urethane prepolymer, comprising a blend of polyvinyl formal, and polycaprolactone; a polyfunctional isocyanate; and a catalyst. Preferred high energy, crystalline explosives suitable for use in the subject compositions include octahydro-1,3,5,7-tetranitro-1,3,5,7-tetrazocine (HMX); hexahydro-1,3,5-trinitro-1,3,5-triazene (RDX); 2,2-bis[(nitro oxy)methyl]-1,3-propanediol-dinitrate; trimethylol ethane trinitrate (TMETN); and 2,4,6-trinitro-1,3,5-benzene triamine. Suitable energetic plasticizers include bis (2-fluoro-2,2,-dinitroethyl) formal; nitro plasticizer which consists of a 50:50 mixture of bis(2,2-dinitropropyl) formal and bis(2,2-dinitropropyl) acetal, (NP); 1,2,4-butanetriol trinitrate; diethleneglycol dinitrate; and ethyleneglycol dinitrate. Polymeric binders of the instant invention include polyvinyl formal, a polyfunctional isocyanate and polycaprolactone.

The ECX compositions of the subject invention are useful as high performance munitions such as shaped charges and self forging fragments.

DETAILED DESCRIPTION OF THE PREFERRED EMBODIMENT

Figure 1:
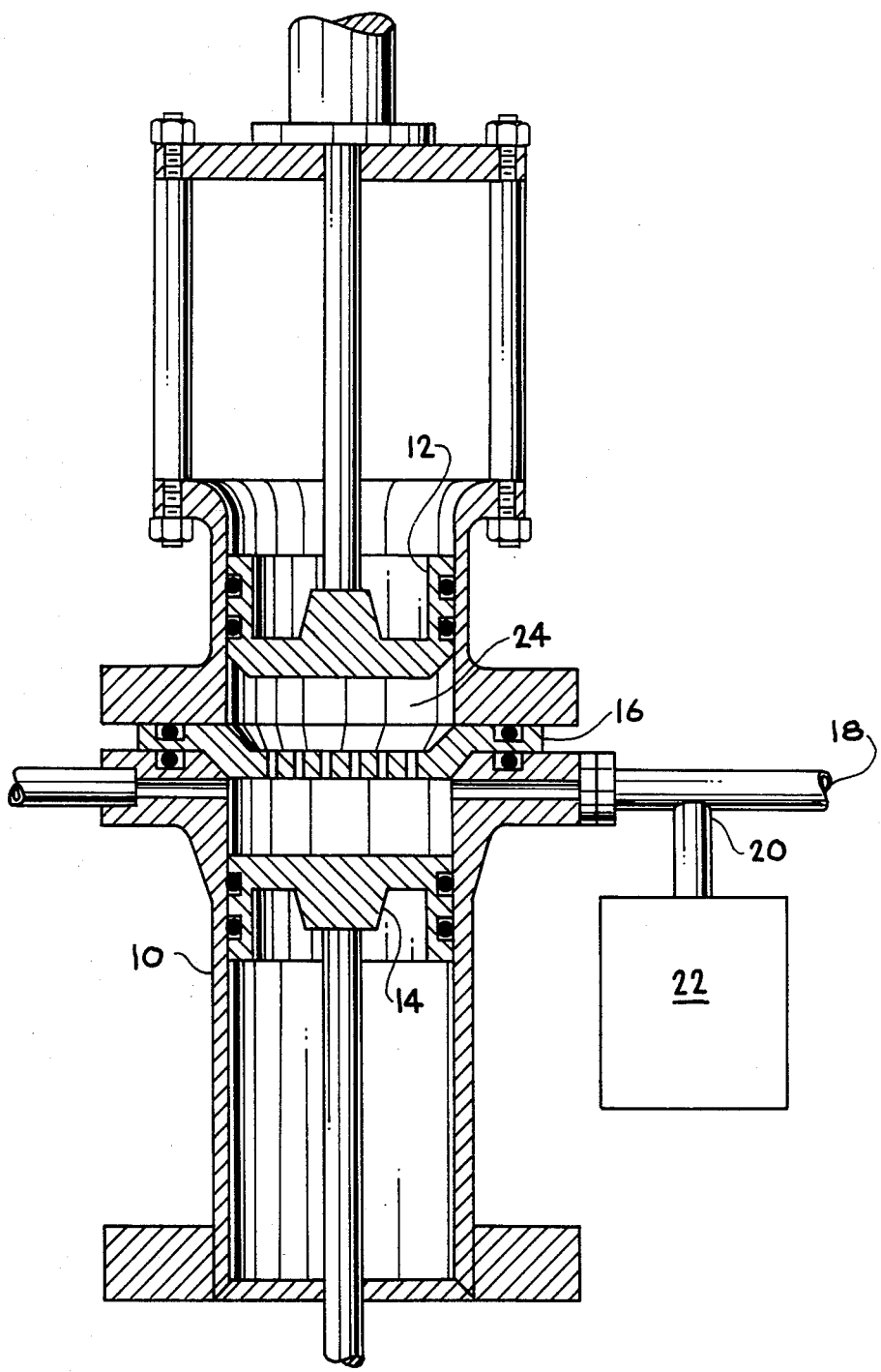
FIG. 1 is a schematic view of the type of deaerator loader apparatus used in the loading of the subject ECX compositions.

The subject invention is directed to high energy, multiphase, extrusion cast explosive (ECX) compositions which broadly comprise a crystalline explosive material; an energetic liquid plasticizer; a urethane prepolymer, comprising a blend of polyvinyl formal and polycaprolactone; a polyfunctional isocyanate; and a catalyst. Preferred crystalline explosive materials for use in the subject compositions include but are not limited to octahydro-1,3,5,7-tetranitro-1,3,5,7-tetrazocine, commonly called octogen or HMX; hexahydro-1,3,5-trinitro-1,3,5-triazene, commonly known as hexogen or RDX; 2,2-bis[(nitro oxy)methyl]-1,3-propanediol-dinitrate, also called pentaerythritol tetranitrate or PETN and 2,4,6-trinitro-1,3,5-benzene triamine or TATB and mixtures thereof. Suitable energetic, liquid plasticizers include but are not limited to bis(2-fluoro-2,2,-dinitroethyl)formal, [FC(NO$_2$)$_2$CH$_2$OCH$_2$OCH$_2$C(NO$_2$)$_2$F], commonly known as FEFO, nitro plasticizer (NP) which consists of a 50:50 mixture of bis(2,2-dinitropropyl) formal and bis(2,2-dinitropropyl) acetal, 1,2,4-butanetriol trinitrate (BTTN), trimethylol ethane trinitrite (TMETN), diethyleneglycol dinitrate (DEGDN) and ethyleneglycol dinitrate (EGDN) and mixtures thereof. Polymeric binders used in the subject invention include but are not limited to polyvinyl formal (PVF), a trifunctional isocyanate (Desmodur N-100) and polycaprolactone (PCL). PVL and PCL are available in several grades and with different functionalities.

Several polyfunctional isocyanates are suitable as cross linkers. Exemplary cross-linking agents include toluene diisocyanate (TDI), isopherone diisocyanate (IPDI), PAPI, a polymeric isocyanate made by Upjohn Company and Desmodur, a polyfunctional isocyante made by Mobay Chemical Corporation. The following chemical formula represents Desmodur:

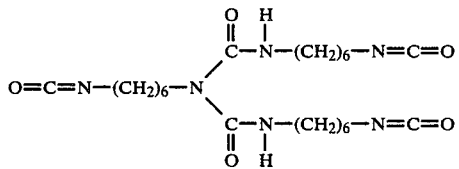

Desmodur N-75 and N-100 are the preferred cross-linking agents, Desmodur N-100, a trifunctional isocyanate, being the most preferred.

Catalysts suitable in the practice of the subject invention include dibutyl tin dilaurate (DBTDL), ferric acetyl acetonate (FeAA) and bismuth triphenyl (BiPh$_3$). In propellant formulations of the subject compositions, other solid ingredients such as ammonium perchlorate (AP) and aluminum (Al) may be optionally included.

PVF was obtained from Monsanto Chemical Company and is sold under the trade name of Formvar. In all the compositions listed below, PVF 5/95 was used. PVF 5/95 is polyvinylformal, having a molecular weight of approximately 12,000, f=15, equivalent weight of 830 and a density of 1.227 g/cc. PCL 240, with a molecular weight of about 1986, f=2.0, equivalent weight of 993, and a density of 1.07 g/cc, was used in the compositions, and was obtained from Union Carbide Corporation.

PVF 5/95 is a highly polyfunctional polymer and PCL 240 is a difunctional polymer. A great deal of flexibility in the cross-link density is obtained by blending the two polymers. However, PVF 5/95 when dissolved in FEFO yields a highly viscous solution which is difficult to vacuum cast. However, by using a process that uses pressure-deaeration to move the mix from a deaeration cavity to the mold, the viscosity problem was overcome. The particular combination of the urethane polymer components and the energetic plasticizer used in the subject ECX compositions yielded a polymeric binder composition that cured extremely well and also enabled the use of up to about 92% or more of the plasticizer in the polymeric binder which has not been heretofore achieved. The use of greater amounts of the energetic plasticizer in these compositions would result in the use of lesser amounts of the inert polymer, thereby achieving a greater energy density. These compositions are also economical to prepare.

The following examples are presented to best illustrate the subject invention and are not to be construed as limiting the scope of the invention in any manner.

EXAMPLE 1

The Processing:

The processing of the ECX compositions prepared according to the subject invention occurred in two major steps: (1) the mixing and (2) the deaeration and loading. The ECX was mixed in a vertical, high shear mixer with a jacketed mixing bowl and using phanetary action. The vertical type mixer was used to keep the explosive away from the mixing blade support bearings.

The mixture was prepared by dissolving the prepolymer and plasticizers in FEFO diluted with dichloromethane. The predried crystalline explosive was stirred in and the material heated. An air sweep was established while mixing to remove the solvent. When all the solvent had been aspirated, a vacuum mix cycle was used while cooling the mixture to ambient temperature. Finally, the isocyante and the catalyst are added and vacuum mixed again.

The mixture prepared as above was too viscous to be able to vacuum cast. Processing of the material included moving the mixture under pressures greater than atmospheric pressure. Use of viscous mixtures under pressure deaeration, enabled the use of high solids loading of fine crystalline explosive. The pressure-deaeration method also enabled the use of finer particles of the solid materials, thereby yielding a product which was less sensitive to mechanical stimulants. Some specialized equipment was, therefore, developed, that uses low pressure hydraulic systems to deaerate the mix and to extrusion-cast it to the desired shape. Basically, the equipment consists of a long, vertical, hollow cylinder 10 with two hydraulic pistons 12 and 14 operating from either end, as shown in FIG. 1. Separating the two pistons is an orifice plate 16 below which are located vacuum and discharge ports 18 and 20 respectively. The mold or device 22 for filling is connected to discharge port 20. The mixed paste was placed in the upper chamber 24 and the entire system was evacuated. The paste was forced through orifice plate 16 and thoroughly deaerated. Vacuum port 18 was closed and, without breaking the vacuum, the material was forced into the mold while the mold was being evacuated. The explosive was then cured in place within the mold or device 22. Low pressure hydraulic cylinders which develop only 700–1400 Kpa (100–200 psi) were used.

Some exemplary explosive compositions prepared in accordance with the subject invention are designated as RX-08-EL, RX-08-FN, RX-08-FO, RX-25-BG, RX-25-BL, and RX-08-FQ. The procedure used for the preparation of these compositions as described herein, is as follows:

Appropriate amounts of PVF-5/95 and PCL 240, as indicated, were dissolved in a solution of the liquid plasticizer in an appropriate solvent such as methylene chloride. HMX having a median particle size less than about 100 $\mu$, preferably about 50–70 $\mu$, or RDX or PETN or TATB having the appropriate particle size, and mixtures thereof, were added to the solution and the solvent was then distilled off. Other additives such as perchlorates, metal powders such as aluminum, trinitro toluenes and the like, may be optionally included in the mixture. Ammonium perchlorate and aluminum are the preferred additives. The curing agent and a small amount (approximately 0.002 percent by weight of the total ECX composition of the appropriate catalyst) were dissolved in a minimum amount of methylene chloride and added to the mixture of HMX and liquid plasticizer. The mixture was deaerated and loaded into its final container. Curing was completed in less than 48 hours.

EXAMPLE 2

The procedure of Example 1 was followed to prepare the following ECX composition.

| Composition RX-08-EL: | |
|---|---|
| Ingredient | Wt % |
| HMX | 75.9 |
| FEFO | 22.2 |
| PVF | 0.6 |
| PCL | 1.0 |
| N-100 | 0.3 |
| FeAA | Tr |

EXAMPLE 3

The procedure of Example 1 was followed to prepare the following ECX composition.

| Composition RX-08-FN: | |
|---|---|
| Ingredient | Wt % |
| HMX | 74.0 |
| TMETN | 20.8 |
| PVF | 2.0 |
| PCL | 2.4 |
| N-100 | 0.8 |
| FeAA | Tr |

EXAMPLE 4

The procedure of Example 1 was followed to prepare the following ECX composition.

| Composition RX-08-FO: | |
|---|---|
| Ingredient | Wt % |
| HMX | 73.0 |
| NP | 22.9 |
| PVF | 0.8 |
| PCL | 2.7 |

| Composition RX-08-FO: | |
|---|---|
| Ingredient | Wt % |
| N-100 | 0.6 |
| FeAA | Tr |

EXAMPLE 5

The procedure of Example 1 was followed to prepare the following ECX composition.

| Composition RX-25-BG: | |
|---|---|
| Ingredient | Wt % |
| HMX | 40.0 |
| FEFO | 26.2 |
| AP | 9.9 |
| Al | 19.3 |
| PVF | 2.0 |
| PCL | 1.9 |
| N-100 | 0.7 |
| FeAA | Tr |

EXAMPLE 6

The procedure of Example 1 was followed to prepare the following ECX composition.

| Composition RX-25-BL: | |
|---|---|
| Ingredient | Wt % |
| RDX | 38.7 |
| FEFO | 26.7 |
| AP | 10.0 |
| Al | 19.8 |
| PVF | 2.0 |
| PCL | 2.0 |
| N-100 | 0.7 |
| FeAA | Tr |

EXAMPLE 7

The procedure of Example 1 was followed to prepare the following ECX composition.

| Composition RX-08-FQ: | |
|---|---|
| Ingredient | Wt % |
| HMX | 10.0 |
| NP | 23.9 |
| TATB | 61.0 |
| PVF | 0.9 |
| PCL | 3.4 |
| N-100 | 0.8 |
| DBTDL | Tr |

The subject ECX composition utilize more of the explosive materials, thus yielding a product with greater detonation energy. The method of preparing these compositions by pressure deaerating the mixture, enables the use of finer particles of the explosive material and dense packing so that it is less sensitive to mechanical stimulants and is stable over relatively long storage periods. The instant compositions also exhibit a greater degree of homogeneity and produce a smoother detonation front. The polymeric binder used in these compositions contain up to about 92% or more of the energetic plasticizer so that less of the crystalline explosive may be used without sacrificing explosive energy.

The foregoing description of some preferred embodiments of the subject invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A multiphase extrusion cast explosive composition comprising:
   a crystalline explosive material;
   an energetic liquid plasticizer;
   a urethane prepolymer mixture, comprising a blend of polyvinyl formal and polycaprolactone;
   a polyfunctional isocyanate; and
   a catalyst.

2. The composition of claim 1 wherein said crystalline explosive is selected from the group consisting of octahydro-1,3,5,7-tetranitro-1,3,5,7-tetrazocine, hexahydro-1,3,5-trinitro-1,3,5-triazene, 2,2-bis[(nitro oxy)-methyl]-1,3-propanediol-dinitrate, and 2,4,6-trinitro-1,3,5-benzene triamine.

3. The composition of claim 2 wherein said crystalline explosive is octahydro-1,3,5,7-tetranitro-1,3,5,7-tetrazocine.

4. The composition of claim 2 wherein said crystalline explosive is hexahydro-1,3,5-trinitro-1,3,5-triazene.

5. The composition of claim 1 wherein said plasticizer is selected from the group consisting of bis(2-fluoro-2,2,-dinitroethyl) formal, a mixture of bis(2,2-dinitro propyl) formal and bis(2,2-dinitro propyl) acetal, 1,2,4-butanetriol trinitrate, trimethylol ethane trinitrate, diethyleneglycol dinitrate, and ethyleneglycol dinitrate.

6. The composition of claim 5 wherein said plasticizer is bis(2-fluoro-2,2,-dinitroethyl) formal.

7. The composition of claim 5 wherein said plasticizer is a mixture of bis(2,2-dinitro propyl) formal and bis(2,2-dinitro propyl) acetal.

8. The composition of claim 5 wherein said plasticizer is trimethylol ethane trinitrate.

9. The composition of claim 1 wherein said crystalline explosive has an average particle size of less than about 100 $\mu$.

10. The composition of claim 1 wherein said cross-linking agent is a trifunctional isocyante.

11. The composition of claim 3 wherein said crystalline explosive is octahydro-1,3,5,7-tetranitro-1,3,5,7-tetrazocine, said plasticizer is bis(2-fluoro-2,2,-dinitroethyl) formal, said polyfunctional isocyante is trifunctional, and said catalyst is ferric acetyl acetonate.

12. The composition of claim 3 wherein said crystalline explosive is octahydro-1,3,5,7-tetranitro-1,3,5,7-tetrazocine, said plasticizer is trimethylol ethane trinitrate, said prepolymer is a mixture of polyvinyl formal 5/95 and polycaprolactone PCL-240, said polyfunctional isocyante is trifunctional, and said catalyst is ferric acetyl acetonate.

13. The composition of claim 3 wherein said crystalline explosive is octahydro-1,3,5,7-tetranitro-1,3,5,7-tetrazocine, said plasticizer is a mixture of bis(2,2-dinitro propyl) formal and bis(2,2-dinitro propyl) acetal, said prepolymer is a mixture of polyvinyl formal 5/95 and polycaprolactone PCL-240, said polyfunctional isocyante is trifunctional, and said catalyst is ferric acetyl acetonate.

14. The composition of claim 11 further including therein ammonium perchlorate and aluminum.

15. The composition of claim 4 wherein said crystalline explosive is hexahydro-1,3,5-trinitro-1,3,5-triazene, said plasticizer is bis(2-fluoro-2,2,-dinitroethyl) formal, said prepolymer is a mixture of polyvinyl formal 5/95 and polycaprolactone PCL-240, said polyfunctional isocyante is trifunctional, and said catalyst is ferric acetyl acetonate.

16. The composition of claim 15, further including therein ammonium perchlorate and aluminum.

17. The composition of claim 3 wherein said crystalline explosive is octahydro-1,3,5,7-tetranitro-1,3,5,7-tetrazocine, said plasticizer is a mixture of bis(2,2-dinitro propyl) formal and bis(2,2-dinitro propyl) acetal, said prepolymer is a mixture of polyvinyl formal 5/95 and polycaprolactone PCL-240, said polyfunctional isocyante is trifunctional, and said catalyst is dibutyl tin dilaurate.

18. The composition of claim 17 further comprising 2,4,6-trinitro-1,3,5-benzene triamine.

* * * * *